US011249060B2

(12) United States Patent
Kim et al.

(10) Patent No.: US 11,249,060 B2
(45) Date of Patent: Feb. 15, 2022

(54) METHOD FOR QUANTITATIVELY ANALYZING RESIDUAL CL IN ZINC FERRITE

(71) Applicant: LG Chem, Ltd., Seoul (KR)

(72) Inventors: Sangwoo Kim, Daejeon (KR); Hyun Kyung Yoon, Daejeon (KR); Sumin Na, Daejeon (KR); Jieun Kim, Daejeon (KR); Hyun Woo Nho, Daejeon (KR)

(73) Assignee: LG Chem, Ltd.

( * ) Notice: Subject to any disclaimer, the term of this patent is extended or adjusted under 35 U.S.C. 154(b) by 292 days.

(21) Appl. No.: 16/605,704

(22) PCT Filed: Jul. 16, 2018

(86) PCT No.: PCT/KR2018/008011
§ 371 (c)(1),
(2) Date: Oct. 16, 2019

(87) PCT Pub. No.: WO2019/035563
PCT Pub. Date: Feb. 21, 2019

(65) Prior Publication Data
US 2020/0333303 A1    Oct. 22, 2020

(30) Foreign Application Priority Data

Aug. 18, 2017   (KR) .................. 10-2017-0104612

(51) Int. Cl.
*G01N 31/12* (2006.01)
*G01N 30/06* (2006.01)
(Continued)

(52) U.S. Cl.
CPC .......... *G01N 30/96* (2013.01); *G01N 30/14* (2013.01); *G01N 31/12* (2013.01); *G01N 2030/067* (2013.01)

(58) Field of Classification Search
CPC ........ G01N 31/12; G01N 30/06; G01N 30/14; G01N 1/22; G01N 30/88; G01N 30/96
(Continued)

(56) References Cited

U.S. PATENT DOCUMENTS 5,429,946 A * 7/1995 Baccanti ............... G01N 31/12
422/78
5,547,876 A * 8/1996 Chen ..................... B01J 23/20
436/119
(Continued)

FOREIGN PATENT DOCUMENTS

CN      0001413301 A    4/2003
CN      201765148 U     3/2011
(Continued)

OTHER PUBLICATIONS

Pereira, J. S. F. et al, Journal of Chromatography A, 2008, 1213,) 249-252.*
(Continued)

*Primary Examiner* — Arlen Soderquist
(74) *Attorney, Agent, or Firm* — Lerner, David, Littenberg, Krumholz & Mentlik, LLP

(57) ABSTRACT

The present invention relates to a method for quantitatively analyzing Cl, remaining after synthesis, in zinc ferrite synthesized using chloride precursors such as zinc chloride and iron chloride, and provides a method capable of using, in a quantitative analysis method of Cl remaining after synthesis of an inorganic material, AQF-IC, which has been used only in the quantitative analysis of an organic sample since gaseous Cl, discharged after burning zinc ferrite in an automatic quick furnace (AQF) by using an Sn capsule and tungsten oxide (WO3), is analyzed through ion chromatography (IC).

8 Claims, 1 Drawing Sheet

(51) Int. Cl.
*G01N 30/14* (2006.01)
*G01N 1/22* (2006.01)
*G01N 30/88* (2006.01)
*G01N 30/96* (2006.01)

(58) Field of Classification Search
USPC .................................................. 436/124, 155
See application file for complete search history.

(56) References Cited

U.S. PATENT DOCUMENTS

| | | | | |
|---|---|---|---|---|
| 6,489,877 | B1* | 12/2002 | Yamamoto | H01F 41/046 336/200 |
| 2009/0004747 | A1 | 1/2009 | Agree et al. | |
| 2016/0229931 | A1 | 8/2016 | Yoo et al. | |

FOREIGN PATENT DOCUMENTS

| | | |
|---|---|---|
| CN | 105717252 A | 6/2016 |
| CN | 106841502 A | 6/2017 |
| DE | 102006049927 A1 | 8/2007 |
| JP | S63298056 A | 12/1988 |
| JP | H0543247 A | 2/1993 |
| JP | H0763743 A | 3/1995 |
| JP | H0834616 A | 2/1996 |
| JP | 2873804 B2 | 3/1999 |
| JP | H11237324 A | 8/1999 |
| JP | 2000121516 A | 4/2000 |
| JP | 2000275236 A | 10/2000 |
| JP | 2003183025 A | 7/2003 |
| JP | 2008082808 A | 4/2008 |
| JP | 2010156568 A | 7/2010 |
| JP | 2010210305 A | 9/2010 |
| JP | 2010532477 A | 10/2010 |
| JP | 2011021925 A | 2/2011 |
| JP | 2012163545 A | 8/2012 |
| JP | 2016095288 A | 5/2016 |
| JP | 2017015414 A | 1/2017 |
| JP | 2017096865 A | 6/2017 |
| KR | 20070093269 A | 9/2007 |
| KR | 101433228 B1 | 8/2014 |
| KR | 20140125727 A | 10/2014 |
| KR | 20160082609 A | 7/2016 |
| WO | 0146683 A2 | 6/2001 |
| WO | 2009045002 A1 | 4/2009 |

OTHER PUBLICATIONS

Shimizu, K. et al, Geochemical Journal 2015, 49, 113-124.*
Pereira, R. M. et al, Talanta 2016, 147, 76-81.*
Agustin et al, "Combustion Ion Chromatography—Enhancing Halogen Detection Using Preconcentration Methods", Brazilian Journal of Analytical Chemistry, Apr. 2017, pp. 1-7, vol. 4, Issue 15, XP055703813.
Anonymous: "Determination of Chlorine and Sulfur in 3,5-dichloro-2-hydroxybenzenesulforic Acid Sodium Salt," Application Sheet No. AQF CH 010E, Mar. 2017 pp. 1-2, XP055570790.
Extended European Search Report with Written Opinion for Application No. 18845486.2 dated Jun. 25, 2020, 7 pages.
Revesz, "Determination of the [delta]34S of Total Sulfur in Solids", RSIL Lab Code 1800, 2012, pp. 1-41, XP055570794.
Bernius, et al., Determination of Total Sulfur in Fertilizers by High Temperature Combustion: Single-Laboratory Validation, Journal of AOAC International, 2014, pp. 731-735, vol. 97, No. 3.
Emmenegger et al., Sulfur and Halide Determination by Combustion Ion Chromatography, The Application Notebook, Jun. 2010, pp. 4-7.
Fisher, et al., Accurate and Reproducible Determination of Halogens in Coal Using Combustion Ion Chromatography, PN71968-EN 08/16S, 2016, pp. 1-3, Thermo Fisher Scientific Inc.
International Search Report for Application No. PCT/KR2018/008011, dated Oct. 26, 2018, pp. 1-3.
Mitsubishi Chemical Analytech, Determination of chlorine and sulfur in 3,5-dichloro-2-hydroxybenzenesulfonic acid sodium salt, Aug. 2017, pp. 1-2, Application Sheet No. AQF CH 010E.
Révész, et al., Determination of the ?34S of Total Sulfur in Solids; RSIL Lab Code 1800, U.S. Department of the Interior, U.S. Geological Survey, 2012, pp. 1-42.
Thermo Fisher Scientific Inc., Combustion IC System Halogen and sulfur determinations-pyrolysis of difficult samples, BR71114-EN 0418S, 2016, pp. 1-9.
Wang et al., Determination of chloride in some building materials by automatic quick furnace-ion chromatography, Chinese Journal of Analysis Laboratory, 2007, vol. 26, No. 12, pp. 10-13. (Machine generated English abstract attached).
WIPS Search Report dated Feb. 14, 2018, pp. 1-13.
WIPS Search Report dated May 18, 2017, pp. 1-11.
"The Preparation and Reactivity Testing of ZnFe2O4/AC Medium Hot Coal Gas Desulfurizer", Taiyuan University of Technology, Chemical Engineering and Technology, Feb. 2015, 2 pages (Partial English abstract provided within).
Chinese Search Report for Application No. 201880018729.8 dated Jul. 8, 2021, 4 pages.

* cited by examiner

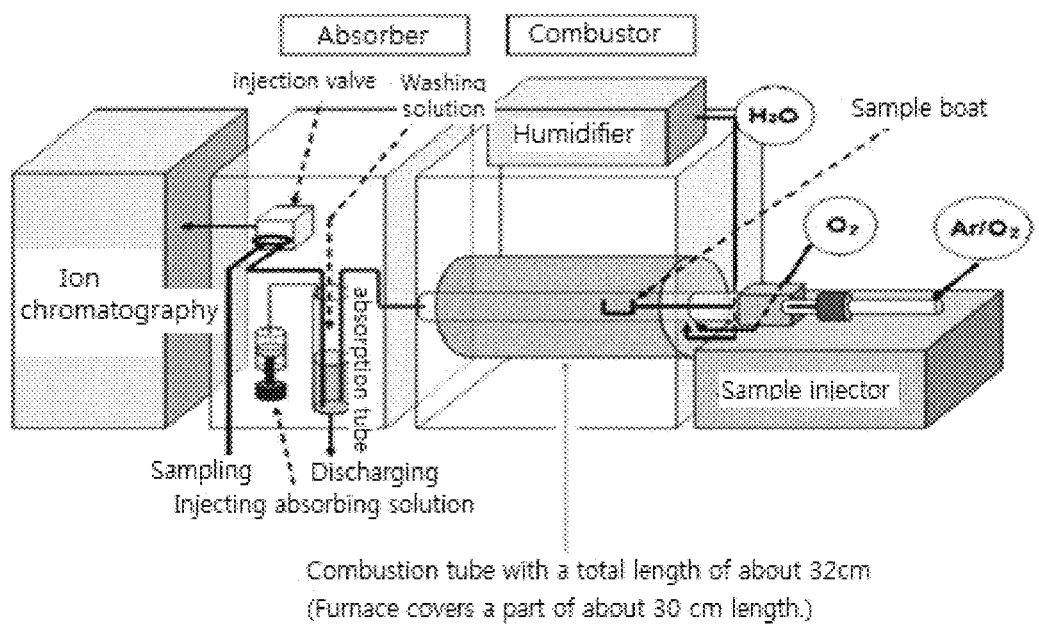

METHOD FOR QUANTITATIVELY ANALYZING RESIDUAL CL IN ZINC FERRITE

CROSS-REFERENCE TO RELATED APPLICATIONS

This application is a national phase entry under 35 U.S.C. § 371 of International Application No. PCT/KR2018/008011, filed Jul. 16, 2018, which claims priority to Korean Patent Application No. 10-2017-0104612, filed Aug. 18, 2017, the disclosures of which are incorporated herein by reference.

BACKGROUND OF THE INVENTION

1. Field of the Invention

The present invention relates to a method for analyzing the residual Cl content in zinc ferrite synthesized from a chloride precursor such as zinc chloride, iron chloride and the like.

2. Description of the Related Art

Elemental analysis (EA) methods such as X-ray fluorescence (XRF) analysis, spectroscopic analyses using scanning electron microscope (SEM)/energy dispersive X-ray spectrometer (EDS), etc. are conventionally used to analyze residual Cl content in synthesized inorganic materials. However, in these methods, quantitative analyses were difficult to carry out because there was no commercially available reference material that exactly matches the matrix of a sample. Although there is a commercially available reference material, since XRF analysis can be used for analyzing bulk samples, a rather large amount of sample may be required, and analyses using an electron microscope such as SEM were sometimes unable to quantify the bulk content due to its characteristics of microscale analysis. In addition, the analysis using an electron microscope has a disadvantage in that the trace amount cannot be determined.

Among the analysis methods, an ion chromatography (IC) device equipped with an automatic quick furnace (AQF) pretreatment apparatus for sample combustion has been known to be mainly used for analyzing organic materials and not for analyzing inorganic materials.

A method for analyzing the contents of Cl and S present in 3,5-dichloro-2-hydroxybenzenesulfonic acid sodium salt by using IC device equipped with AQF pretreatment apparatus, including addition of tungsten oxide ($WO_3$) to the analytical samples and combustion of the samples, is disclosed in Mitsubishi Chemical Analytech, AQF CH 010E Materials, "Determination of chlorine and sulfur in 3,5-dichloro-2-hydroxybenzenesulfonic acid sodium salt." Furthermore, a quantitative analysis method of S content by using MACRO cube analyzer, which comprises introducing sulfanilamide-based samples to a high-temperature reactor, adding Sn foils or Sn capsules to the reactor, adding $WO_3$ to the reactor, and then combusting the contents in the reactor, is disclosed in Jean Bernius, et al., J. AOAC Int., Vol. 97, No. 3, pp. 731-735, "Determination of Total Sulfur in Fertilizer by High Temperature Combustion: Single-Laboratory Validation." However, all the analytical methods described in these references relate to analyses of organic materials.

Accordingly, the inventors have studied to overcome the disadvantages of the above methods and to find analysis methods for analyzing the residual Cl content in synthesized inorganic materials. As a result, it has been found that residual Cl in the zinc ferrite synthesized from chloride precursors such as zinc chloride, iron chloride, etc. can be quantitatively analyzed by IC device equipped with AQF pretreatment apparatus, which has been used for the quantitative analyses of organic materials only, by burning zinc ferrite contained in Sn capsules together with $WO_3$.

SUMMARY OF THE INVENTION

An object of the present invention is to provide a method for analyzing the content of residual Cl in zinc ferrite synthesized from chloride precursors such as zinc chloride, iron chloride and the like by applying IC device equipped with AQF pretreatment apparatus.

The present invention provides a method for quantitative analysis of residual Cl in zinc ferrite synthesized from chloride precursors such as zinc chloride and iron chloride as an inorganic material by IC device equipped with AQF pretreatment apparatus used only for quantitative analyses of solid organic materials.

In order to accomplish the object of the present invention, the present invention provides, as one embodiment, a method for quantitative analysis of residual Cl in synthesized zinc ferrite, which comprises:

introducing zinc ferrite samples synthesized from chloride precursors such as zinc chloride, iron chloride, etc., into Sn capsules, and then continuously transferring the samples with tungsten oxide into an automatic quick furnace (AQF) pretreatment apparatus heated at a high temperature;

burning the Sn capsules containing the samples in the AQF pretreatment apparatus;

collecting gaseous Cl released by the combustion in the AQF pretreatment apparatus in an absorbing solution; and injecting the absorbing solution in which gaseous Cl has been collected into an ion chromatography (IC), and then quantifying the Cl content.

According to one embodiment, the AQF may have a heating furnace made of gypsum, and a quartz glass tube may be present as a combustion tube passing through the furnace. The length of the quartz glass tube may be about 40 cm, and the sample may be heated at a point about 16 cm, which is the center part of the quartz glass tube.

A part of the glass tube at the starting point and a part of the glass tube at the end point may be out of the heating furnace, and about 30 cm length of the glass tube may be present in the heating furnace. FIG. 1 illustrates an example of an AQF apparatus.

According to one embodiment, the samples may be continuously transferred to a heating position in the AQF for a time of less than 10 seconds, for example, 3 to 8 seconds.

According to one embodiment, the combustion temperature of the zinc ferrite samples is at least 1,000° C.

Typical AQF pretreatment apparatus may raise the combustion temperature up to 1,000° C. When Sn capsules are used, the combustion temperature may be increased to 1,800° C. Therefore, it is possible to artificially increase the combustion temperature by using Sn capsules, which is impossible with AQF preprocessing equipment only.

According to one embodiment, the absorbing solution for collecting gaseous Cl released by combustion may be a solution of $H_2O:H_2O_2=300:1$ to 350:1 (volume ratio), for example, a solution of 500 ml of $H_2O$ and 1.5 ml of $H_2O_2$, In some cases, the absorbing solution may not contain $H_2O_2$.

According to one embodiment, $WO_3$ may be used as a combustion improver to prevent components such as Cl, S and the like from forming certain compounds by reaction with some alkali components at high temperatures and to cause complete combustion, and it may be added in an amount of 3 times or more of the sample.

According to one embodiment, the Sn capsules may be Sn capsules commercially available from LECO Corporation, for example, 502-040 having a thickness of 0.05-0.1 mm or 240 06400 having a thickness of 0.01 mm or less.

According to present invention providing a method for quantitative analysis of residual Cl in zinc ferrite synthesized from chloride precursors such as zinc chloride, iron chloride, etc., IC device equipped with AQF pretreatment apparatus used for quantitative analyses of organic material samples only can apply for quantitative analysis of residual Cl in the synthesized inorganic materials by combustion of the zinc ferrite with Sn capsules.

BRIEF DESCRIPTION OF THE DRAWINGS

FIG. 1 is a schematic diagram of an example of an AQF device.

DETAILED DESCRIPTION OF THE INVENTION

The present invention may be subject to various modifications and may have various embodiments, and specific embodiments are to be exemplified and described in detail. It is to be understood, however, that the intention is not to limit the invention to the particular embodiments, but to cover all modifications, equivalents, and alternatives falling within the spirit and scope of the invention. In the following description of the present invention, detailed description of known functions will be omitted if it is determined that it may obscure the gist of the present invention.

As described above, in the prior art, quantitative analyses of residual Cl in synthesized inorganic materials could not be completely performed. Therefore, the present invention attempts ion chromatography analysis by using AQF pretreatment apparatus applied for solid organic material samples in order to quantitatively analyze residual Cl in zinc ferrite synthesized from chloride precursors such as zinc chloride, iron chloride, etc. as inorganic materials. As a result, the present invention achieves quantitative analyse of residual Cl in synthesized inorganic materials by applying IC device equipped with AQF pretreatment apparatus, which is generally used only for quantitative analyses of organic materials, by burning zinc ferrite contained in Sn capsules together with $WO_3$.

Specifically, the present invention provides, as an embodiment, a method for quantitative analysis of residual Cl in synthesized zinc ferrite, which comprises introducing zinc ferrite samples synthesized from chloride precursors such as zinc chloride, iron chloride, etc., into Sn capsules, and then continuously transferring the samples with tungsten oxide into an automatic quick furnace (AQF) pretreatment apparatus heated at a high temperature;

burning the Sn capsules comprising the samples;

collecting gaseous Cl released by the combustion in the AQF pretreatment apparatus in an absorbing solution; and injecting the absorbing solution in which gaseous Cl has been collected into an ion chromatography (IC), and then quantifying the Cl content.

According to one embodiment of the present invention, AQF pretreatment apparatus of Mitsubishi Chemical Analytech Co., Ltd. which has been used for organic solid samples may be used. According to one embodiment, the AQF may have a heating furnace made of gypsum, and a quartz glass tube may be present as a combustion tube passing through the furnace. The length of the quartz glass tube may be about 40 cm, and the sample may be heated at a point about 16 cm, which is the center part of the quartz glass tube. A part of the glass tube at the starting point and a part of the glass tube at the end point may be out of the heating furnace, about 30 cm length of the glass tube may be present in the heating furnace.

The AQF pretreatment apparatus may raise the combustion temperature up to 1,000° C. at the maximum. When Sn capsules are used, the combustion temperature may be increased to 1,800° C. Therefore, it is possible to artificially increase the combustion temperature by using Sn capsules, which is impossible with AQF pretreatment apparatus alone.

According to one embodiment of the present invention, inorganic samples are placed in Sn capsules and continuously transferred to a combustion position inside the AQF pretreatment apparatus together with $WO_3$ to temporarily raise the maximum combustion temperature (internal temperature of the AQF pretreatment apparatus) of the inorganic samples to about 2,000° C. If the maximum combustion temperature is close to 2,000° C., the Sn capsules melt and release heat, which causes the samples in the capsules to be more quickly and more fully decomposed and release gaseous Cl.

According to one embodiment, the samples are continuously transferred to a combustion position in the AQF pretreatment apparatus for less than 10 seconds, for example 3 to 8 seconds.

According to one embodiment, the gaseous Cl released by the combustion is collected in an absorbing solution (e.g., a solution of 500 mL of $H_2O$ and 1.5 mL of $H_2O_2$).

According to one embodiment, the Sn capsules may be Sn capsules commercially available from LECO Corporation, for example, 502-040 having a thickness of 0.05-0.1 mm or 240 06400 having a thickness of 0.01 mm or less.

The present invention provides a method for quantitative analysis of residual Cl in zinc ferrite synthesized from chloride precursors such as zinc chloride, iron chloride, etc., wherein the samples contained in Sn capsules are continuously transferred into the AQF pretreatment apparatus together with $WO_3$ and are subject to combustion. This makes it possible to use IC analysis by using AQF pretreatment apparatus, which was used for quantitative analyses of organic samples only, for quantitative analyses of residual Cl in synthesized inorganic materials.

Hereinafter, embodiments of the present invention will be described in detail in order to facilitate those skilled in the art to which the present invention pertains. However, the present invention may be embodied with various modifications and variations and is not limited to the embodiments described herein.

Example

In the examples and comparative examples, quantitative analyses of Cl in solid zinc ferrite samples were performed by using IC device equipped with AQF pretreatment apparatus of Mitsubishi Chemical Analytech Co., Ltd., The length of the combustion tube of the AQF is about 320 mm in total, and the combustion of the above samples was performed at the 160 mm position of the combustion tube.

Quantitative analysis experiments were repeated for each of the four zinc ferrite samples of different contents three times or more per each sample. The results of the analyses obtained are shown in Table 1 below.

TABLE 1

Analyses of Cl content in zinc ferrite samples

| sample | | Cl content |
|---|---|---|
| zinc ferrite 1 (water washing) | average | 0.108% |
| | relative standard deviation (RSD) (%) | 3.2 |
| zinc ferrite 2 | average | 0.171% |
| | RSD (%) | 1.4 |
| zinc ferrite 3 (water washing) | average | 1.957% |
| | RSD (%) | 0.3 |
| zinc ferrite 4 | average | 26.729% |
| | RSD (%) | 0.9 |

In addition, for four zinc ferrite samples with different contents, four different combustion conditions were set, and the quantitative analysis experiments were repeated three times or more per each sample under each condition. The results of the analyses obtained are shown in Table 2 below. The values in Table 2 represent the average values.

TABLE 2

Analyses of Cl content in zinc ferrite samples under four different conditions

| sample | Condition 1[1] | Condition 2[2] | Condition 3[3] | Condition 4[4] |
|---|---|---|---|---|
| zinc ferrite 1 (water washing) | 0.108% | 0.102% | 0.099% | 0.101% |
| zinc ferrite 2 | 0.171% | 0.172% | 0.169% | 0.170% |
| zinc ferrite 3 (water washing) | 1.957% | 1.908% | 1.907% | 1.936% |
| zinc ferrite 4 | 26.729% | 26.216% | 26.572% | 26.419% |

[1] Condition 1 - Using Sn capsules and $WO_3$
[2] Condition 2 - Using neither Sn capsules nor $WO_3$
[3] Condition 3 - Using $WO_3$ only
[4] Condition 4 - Using Sn capsules only Lastly, by using a thin or thick Sn capsules, and by inserting the samples into the AQF step by step or continuously transferring the samples to the combustion position (160 mm) of the combustion tube of AQF by adjusting the sample transfer program, the quantitative analysis experiments according to the present invention were carried out (repeated three times or more per each sample). The results of analyses of the Cl content in each zinc ferrite sample are shown in Table 3 below. The values in Table 3 represent average values.

TABLE 3

Analyses of Cl content in zinc ferrite samples according to thickness of Sn capsules and transfer program of samples

| zinc ferrite 1 | TP1[1] | MTP1[2] | MTP2[3] | MTP3[4] | MTP4[5] |
|---|---|---|---|---|---|
| Condition 5[a] | 0.106% | 0.095% | 0.096% | 0.093% | 0.099% |
| zinc ferrite 1 | TP1 | MTP1 | MTP2 | MTP3 | MTP4 |
| Condition 6[b] | 0.109% | 0.110% | 0.109% | 0.111% | 0.112% |

[a] Condition 5 - Thermo Fisher scientific, Sn capsule (240 06400) (diameter 8.0 mm × height 5.0 mm) - thin (0.01 mm or less)
[b] Condition 6 - LECO Corporation, Sn capsule (502-040) (diameter 6.0 mm × height 8.0 mm) - thick (0.05 to 0.1 mm)
[1] TP1 - Transferring the sample to the combustion position step by step according to the temperature program of the sample
[2] MTP1 - Transferring the sample continuously up to 160 mm of AQF at 20 mm per second
[3] MTP2 - Transferring the sample continuously up to 160 mm of AQF at 30 mm per second
[4] MTP3 - Transferring the sample continuously up to 160 mm of AQF at 40 mm per second
[5] MTP4 - Transferring the sample continuously up to 160 mm of AQF at 50 mm per second As can be seen in the results of Tables 1 to 3, the method of analyzing the Cl content in the zinc ferrite samples according to the method of the present invention showed a relative standard deviation value of 3% or less. The method according to the present invention uses both Sn capsules and $WO_3$, and thus the recovery rate of Cl is higher than that in the case of not using Sn capsules and $WO_3$ or using only one of them. In the case of using the thick Sn capsule and continuously transferring the samples to the heating position inside the AQF, the highest recovery rate of Cl was shown.

Therefore, according to the present invention, it is possible to quantitatively analyze residual Cl content in synthesized inorganic materials by using IC device equipped with AQF pretreatment apparatus.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method for quantitative analysis of residual Cl in synthesized zinc ferrite, comprising:
   introducing a sample of zinc ferrite synthesized from a chloride precursor into a Sn capsule to produce an Sn capsule containing the sample;
   then, continuously transferring the Sn capsule containing the samples, along with tungsten oxide ($WO_3$), into an automatic quick furnace (AQF) pretreatment apparatus heated at a high temperature;
   combusting the Sn capsule containing the sample in the AQF pretreatment apparatus;
   collecting gaseous Cl released by the combustion in the AQF pretreatment apparatus in an absorbing solution; and
   injecting the absorbing solution in which gaseous Cl has been collected into an ion chromatography (IC) device, and then quantifying a Cl content.

2. The method for quantitative analysis according to claim 1, wherein the chloride precursor is zinc chloride or iron chloride.

3. The method for quantitative analysis according to claim 1, wherein the sample is transferred into the AQF pretreatment apparatus for less than 10 seconds.

4. The method for quantitative analysis according to claim 1, wherein the combustion is carried out at a temperature of 1,000° C. or higher.

5. The method for quantitative analysis according to claim 1, wherein the absorbing solution is a solution of $H_2O$: $H_2O_2$=300:1 to 350:1 (volume ratio).

6. The method for quantitative analysis according to claim 1, wherein $WO_3$ is a combustion improver that causes complete combustion during the sample combustion.

7. The method for quantitative analysis according to claim 4, wherein a maximum combustion temperature is about 2,000° C.

8. The method for quantitative analysis according to claim 5, wherein the absorbing solution is a solution of 500 mL of $H_2O$ and 1.5 mL of $H_2O_2$.

* * * * *